United States Patent
Araki

(10) Patent No.: US 9,521,471 B2
(45) Date of Patent: Dec. 13, 2016

(54) LINE ACCOMMODATING APPARATUS AND TEMPERATURE CONTROL METHOD

(75) Inventor: Hiroshi Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 962 days.

(21) Appl. No.: 13/387,360

(22) PCT Filed: May 24, 2010

(86) PCT No.: PCT/JP2010/058702
§ 371 (c)(1),
(2), (4) Date: Jan. 26, 2012

(87) PCT Pub. No.: WO2011/013436
PCT Pub. Date: Feb. 3, 2011

(65) Prior Publication Data
US 2012/0119589 A1    May 17, 2012

(30) Foreign Application Priority Data

Jul. 31, 2009  (JP) .................................. 2009-179341

(51) Int. Cl.
H01H 35/00     (2006.01)
H04Q 1/28      (2006.01)

(52) U.S. Cl.
CPC ............. *H04Q 1/28* (2013.01); *Y10T 307/773* (2015.04)

(58) Field of Classification Search
CPC ......... H01H 35/00; H01H 37/00; H01H 47/00
USPC ....................................................... 307/117
See application file for complete search history.

(56) References Cited

U.S. PATENT DOCUMENTS

| | | | |
|---|---|---|---|
| 6,205,010 B1 * | 3/2001 | Ohsaka | H03K 17/0822 307/117 |
| 2003/0126473 A1 | 7/2003 | Maciorowski et al. | |
| 2008/0116852 A1 * | 5/2008 | Kuo | H01M 10/052 320/136 |

FOREIGN PATENT DOCUMENTS

| | | | |
|---|---|---|---|
| JP | 60-041854 A | | 3/1985 |
| JP | 60041854 A | * | 3/1985 |
| JP | H3-178249 A | | 8/1991 |
| JP | H07-154836 A | | 6/1995 |
| JP | 2002-236058 A | | 8/2002 |
| JP | 2002-305610 A | | 10/2002 |
| JP | 2003-150280 A | | 5/2003 |
| JP | 2005-311195 A | | 11/2005 |
| JP | 2006-246616 A | | 9/2006 |
| JP | 2007-199782 A | | 8/2007 |

(Continued)

OTHER PUBLICATIONS

Taiwanese Office Action dated Jun. 4, 2013 with English translation thereof.

(Continued)

*Primary Examiner* — Rexford Barnie
*Assistant Examiner* — Joseph Inge
(74) *Attorney, Agent, or Firm* — McGinn IP Law Group, PLLC

(57) ABSTRACT

When the interior temperature inside a line accommodating apparatus (100) measured by an apparatus-interior temperature sensor (103) is equal to or higher than a predetermined first threshold value, a control unit (105) shuts off the supply of power from a power supply unit (102) to a line module (101-1, 101-2) having a module temperature, measured by a module temperature sensor (104), higher than the sum of a predetermined second threshold value and the interior temperature.

20 Claims, 4 Drawing Sheets

(56) References Cited

FOREIGN PATENT DOCUMENTS

JP          2007199782 A    *   8/2007
JP          2008-256911 A       10/2008
TW            M304161 U         1/2007

OTHER PUBLICATIONS

Japanese Office Action dated Jul. 23, 2014 with a partial English translation.
Japanese Office Action dated May 9, 2014, with partial English translation.

* cited by examiner

Fig. 2

|  | threshold value |
|---|---|
| interior temperature | 35 deg. C |
| difference between the module temperature and the interior temperature | 15 deg. C |
| difference between the interior temperature and the exterior temperature | 10 deg. C |

LINE ACCOMMODATING APPARATUS AND TEMPERATURE CONTROL METHOD

TECHNICAL FIELD

The present invention relates to a line accommodating apparatus that accommodates a plurality of lines and to a temperature control method of controlling the temperature of the interior of the line accommodating apparatus.

BACKGROUND ART

Apparatuses such as communication devices that accommodate lines are not only installed indoors but are also installed outdoors as required.

Normally, the outdoor temperature varies more widely than the indoor temperature. Accordingly, when the outdoor temperature is high, the interior temperature of an apparatus installed outdoors may increase unnecessarily due to the high level of the outdoor temperature (exterior temperature of the apparatus). In such a case, it is necessary to protect internal devices against the high temperature situation.

In general, a radiator called a "heat sink" that decreases the temperature through thermal radiation is often used to decrease the temperature of a device in operation.

There is such a technique in which the temperature inside an apparatus is monitored so as to shut off the power supply to the whole apparatus when the temperature inside the apparatus becomes higher than the normal temperature level (see Patent Document 1 for example).

PRIOR ART DOCUMENTS

Patent Document

Patent Document 1: JP2008-256911A

SUMMARY OF THE INVENTION

Problems to be Solved by the Invention

There is, however, a limit to temperature reduction using a heat sink.

In addition, the technique described in Patent Document 1 has a problem which all functions of the apparatus cease to disable the apparatus for communication and other operations when the temperature inside the apparatus becomes higher than a predetermined temperature. Also, data such as threshold values to be used by the apparatus is stored in a device connected to the apparatus via a network so that this delays the temperature control.

The object of the present invention is to provide a line accommodating apparatus and a temperature control method for solving the above-mentioned problems.

Means for Solving the Problems

A line accommodating apparatus of the present invention is a line accommodating apparatus that accommodates a plurality of lines, comprising:
a plurality of line modules connected to the plurality of lines, respectively;
a power supply unit that supplies power to each of the plurality of line modules;
an apparatus-interior temperature sensor that measures the interior temperature, which is the temperature inside the line accommodating apparatus;
a module temperature sensor that measures the module temperature, which is the temperature of each of the plurality of line modules; and
a control unit that shuts off supply of power from the power supply unit to a line module having a module temperature higher than the sum of a predetermined second threshold value and the interior temperature when the interior temperature is equal to or higher than a predetermined first threshold value.

A temperature control method of the present invention is a temperature control method of controlling the temperature inside a line accommodating apparatus including a plurality of line modules respectively connected to a plurality of lines, the method comprising the steps of:
supplying power to each of the plurality of line modules;
measuring the interior temperature, which is the temperature inside the line accommodating apparatus;
measuring the module temperature, which is the temperature of each of the plurality of line modules; and
shutting off supply of power to a line module having a module temperature higher than the sum of the predetermined second threshold value and the interior temperature when the interior temperature is equal to or higher than the predetermined first threshold value.

Effect of the Invention

As described above, according to the present invention, when the interior temperature inside the line accommodating apparatus, measured by an apparatus-interior temperature sensor, is equal to or higher than a predetermined first threshold value, the control unit shuts off supply of power from the power supply unit to a line module having a module temperature, measured by a module temperature sensor, higher than the sum of a predetermined second threshold value and the interior temperature. This feature enables devices disposed inside the apparatus to be protected against high temperature while continuing the operation of the apparatus.

BRIEF DESCRIPTION OF THE DRAWINGS

FIG. 2 is a diagram showing an example of threshold value data of temperature stored in the control unit shown in FIG. 1.

MODE FOR CARRYING OUT THE INVENTION

Embodiment modes of the present invention will be explained hereinbelow with reference to the drawings.

Figure 1:
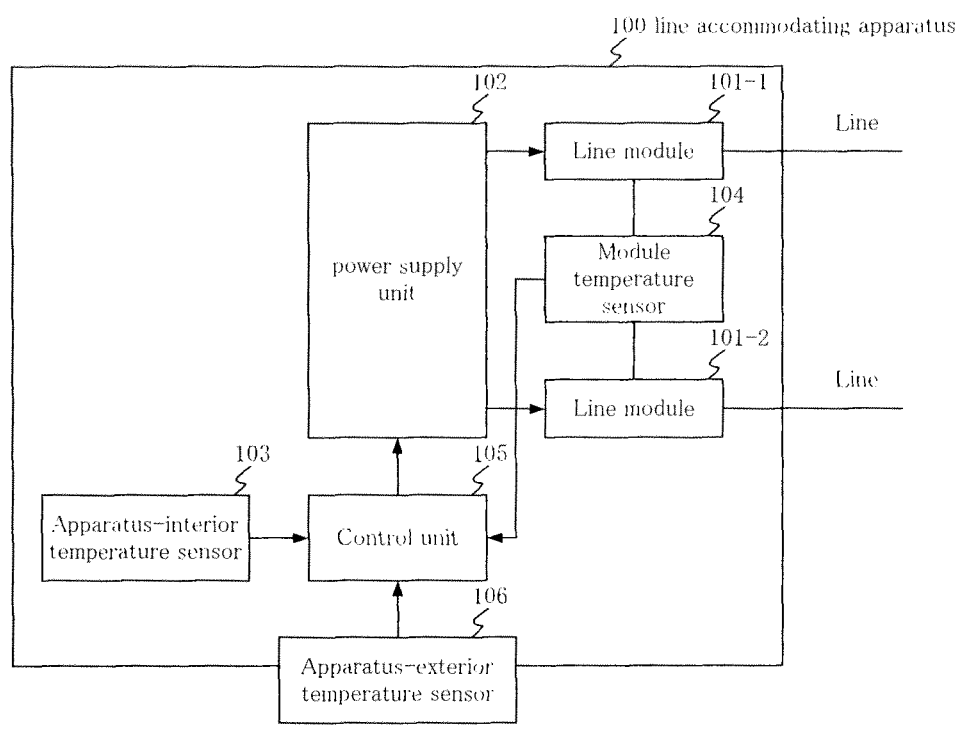
FIG. 1 is a diagram showing an embodiment mode of a line accommodating apparatus of the present invention.

FIG. 1 is a diagram showing an embodiment mode of a line accommodating apparatus of the present invention.

Referring to FIG. 1, line accommodating apparatus 100 of the present embodiment includes line modules 101-1, 101-2, power supply unit 102, apparatus-interior temperature sensor 103, module temperature sensor 104, control unit 105, and apparatus-exterior temperature sensor 106.

Line modules 101-1, 101-2 are connected respectively to plural lines accommodated in line accommodating apparatus 100, and carry out predetermined processing for the connected lines. Line modules 101-1, 101-2 operate with power supplied from power supply unit 102. Line module 101-1 and line module 101-2 provide mutual redundancy so as to enable line accommodating apparatus 100 to operate even when one of the line modules is down. It should be appreciated that the number of line modules may be three or more.

Power supply unit 102 supplies power to line modules 101-1, 101-2.

Apparatus-interior temperature sensor 103 measures the interior temperature, namely, the temperature inside line accommodating apparatus 100.

Module temperature sensor 104 measures module temperatures, or the temperatures of line modules 101-1, 101-2.

Apparatus-exterior temperature sensor 106 measures the exterior temperature, or the temperature outside line accommodating apparatus 100.

Control unit 105 controls the supply of power from power supply unit 102 to line modules 101-1, 101-2 based on the temperatures measured by apparatus-interior temperature sensor 103, module temperature sensor 104, and apparatus-exterior temperature sensor 106.

Control unit 105 stores, in advance, temperature threshold value data for controlling the supply of power from power supply unit 102 to line modules 101-1, 101-2.

FIG. 2 is a diagram showing an example of temperature threshold data stored in control unit 105 shown in FIG. 1.

Control unit 105 shown in FIG. 1 stores temperature threshold value data as shown in FIG. 2. This is preset data.

As shown in FIG. 2, for example 35 deg. C. is stored as the threshold value for the interior temperature (first threshold value). This means that, when control unit 105 carries out a predetermined process based on the interior temperature measured by apparatus-interior temperature sensor 103, the process is carried out with a threshold value of 35 deg. C. Also, 15 deg. C. is stored as a threshold value for the difference between the module temperature and the interior temperature (second threshold value). This means that, when control unit 105 carries out a predetermined process based on the module temperature measured by module temperature sensor 104 and the interior temperature measured by apparatus-interior temperature sensor 103, the process is carried out with a threshold value of 15 deg. C. Further, 10 deg. C. is stored as a threshold value for the difference between the interior temperature and the exterior temperature (third threshold value). This means that, when control unit 105 carries out a predetermined process based on the interior temperature measured by apparatus-interior temperature sensor 103 and the exterior temperature measured by apparatus-exterior temperature sensor 106, the process is carried out with a threshold value of 10 deg. C.

Details of the process carried out by control unit 105 using the threshold values shown in FIG. 2 will be described later.

Although module temperature sensor 104 measures the module temperatures of both line module 101-1 and line module 101-2 in the mode shown in FIG. 1, individual temperature sensors may be provided for line module 101-1 and line module 101-2, respectively.

In addition, although power supply unit 102 supplies power to both line module 101-1 and line module 101-2 in the mode shown in FIG. 1, individual power supply units may be provided for line module 101-1 and line module 101-2, respectively.

Figure 3:
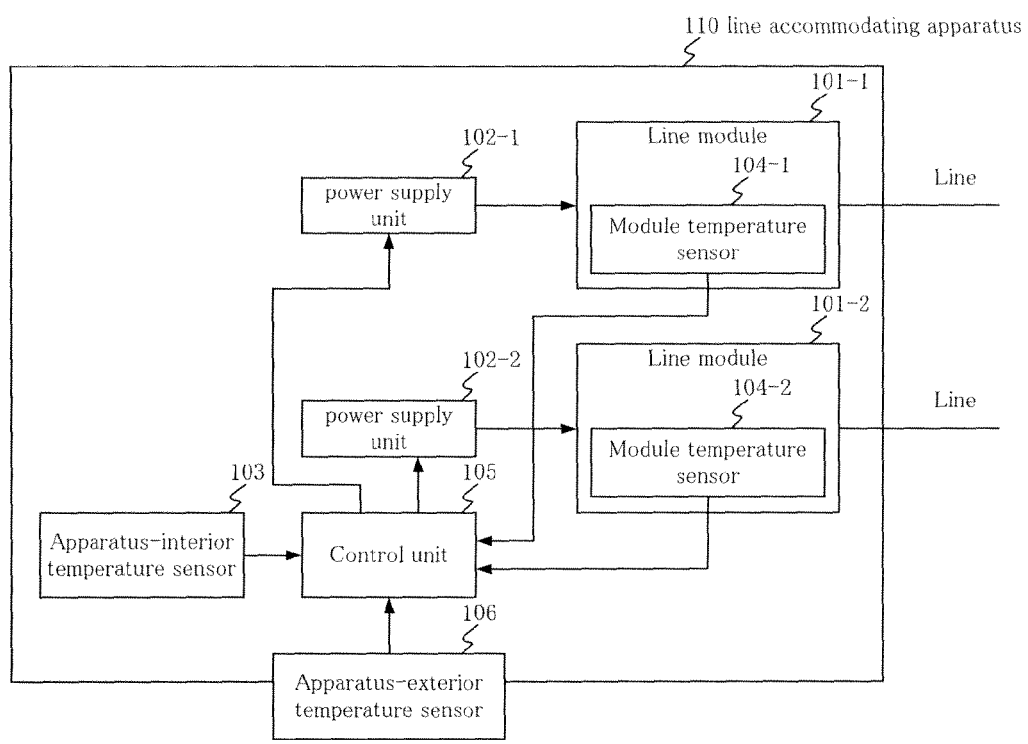
FIG. 3 is a diagram showing another embodiment mode of a line accommodating apparatus of the present invention.

FIG. 3 is diagram showing another mode of a line accommodating apparatus of the present invention.

Referring to FIG. 3, line accommodating apparatus 110 of this mode is provided with module temperature sensors 104-1, 104-2, respectively, in line modules 101-1, 101-2, in place of module temperature sensor 104 shown in FIG. 1. Also, line accommodating apparatus 110 is provided with power supply units 102-1, 102-2 that respectively supply power to line modules 101-1, 101-2 that are provided in place of power supply unit 102 shown in FIG. 1.

Now, a temperature control method of the present invention will be explained hereinafter. Specifically, the temperature control method in the mode shown in FIG. 1 is explained herein using an example.

Figure 4:
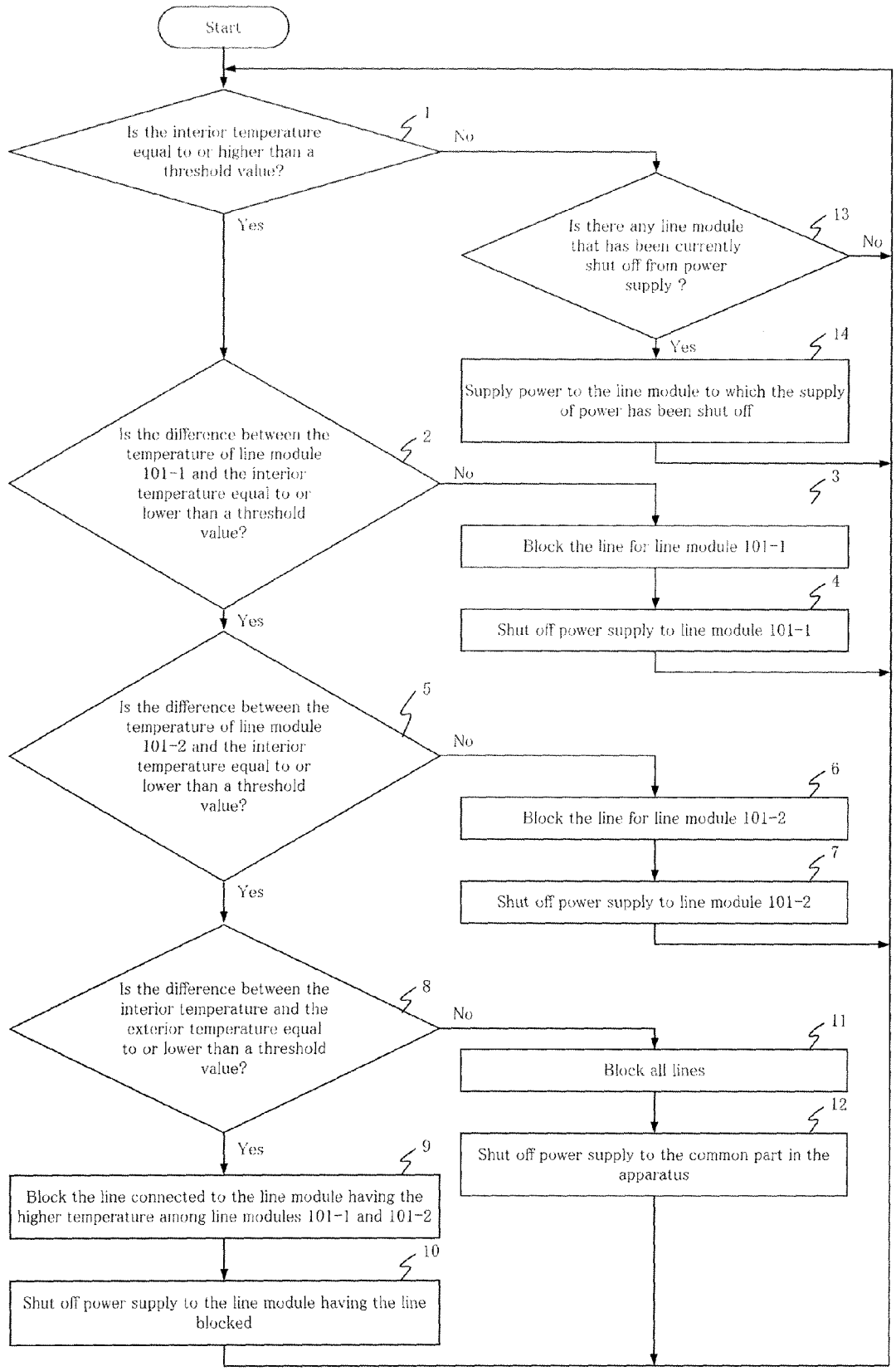
FIG. 4 is a flowchart for explaining a temperature control method in the line accommodating apparatus shown in FIG. 1.

FIG. 4 is a flowchart for illustrating a temperature control method in line accommodating apparatus 100 shown in FIG. 1.

Initially, at Step 1 control unit 105 determines whether the interior temperature of line accommodating apparatus 100 is equal to or higher than a predetermined threshold value. Specifically, control unit 105 determines whether the interior temperature measured by apparatus-interior temperature sensor 103 is equal to or higher than the first threshold value stored in control unit 105. Using the example of threshold value shown in FIG. 2, whether the interior temperature measured by apparatus-interior temperature sensor 103 is equal to or higher than 35 deg. C. is determined.

When control unit 105 determines that the interior temperature measured by apparatus-interior temperature sensor 103 is equal to or higher than the first threshold value stored in control unit 105, then it determines at Step 2 whether the difference between the module temperature of line module 101-1 and the interior temperature is equal to or lower than a predetermined threshold value. Specifically, control unit 105 determines whether the difference between the module temperature of line module 101-1 measured by module temperature sensor 104 and the interior temperature measured by apparatus-interior temperature sensor 103 is equal to or lower than the second threshold value stored in control unit 105. In the example of threshold value shown in FIG. 2, whether the difference between the module temperature of line module 101-1 measured by module temperature sensor 104 and the interior temperature measured by apparatus-interior temperature sensor 103 is equal to or lower than 15 deg. C. is determined. Here, the module temperature of line module 101-1 measured by module temperature sensor 104 is generally higher than the interior temperature measured by apparatus-interior temperature sensor 103. Accordingly, this is equivalent to a determination as to whether the module temperature of line module 101-1 measured by module temperature sensor 104 is equal to or lower than the sum of the second threshold value and the interior temperature measured by apparatus-interior temperature sensor 103.

When it is determined that the difference between the module temperature of line module 101-1 measured by module temperature sensor 104 and the interior temperature measured by apparatus-interior temperature sensor 103 is not equal to or lower than the second threshold value stored in control unit 105, in other words, when it is determined that the module temperature of line module 101-1 measured by module temperature sensor 104 is higher than the sum of the second threshold value and the interior temperature measured by apparatus-interior temperature sensor 103, the line connected to line module 101-1 is blocked at Step S3 by control unit 105. This line blocking operation may be a usual blocking operation, and it is therefore not particularly defined here.

After the line blocking operation is completed, control unit 105 shuts off the supply of power from power supply unit 102 to line module 101-1 at Step 4.

Turning back to Step 2, when control unit 105 determines that the difference between the module temperature of line module 101-1 measured by module temperature sensor 104 and the interior temperature measured by apparatus-interior temperature sensor 103 is equal to or lower than the second threshold value stored in control unit 105, in other words, when it is determined that the module temperature of line module 101-1 measured by module temperature sensor 104 is equal to or lower than the sum of the second threshold value and the interior temperature measured by apparatus-interior temperature sensor 103, control unit 105 determines whether the difference between the module temperature of line module 101-2 and the interior temperature is equal to or lower than a predetermined threshold value at Step 5. Specifically, control unit 105 determines whether the difference between the module temperature of line module 101-2 measured by module temperature sensor 104 and the interior temperature measured by apparatus-interior temperature sensor 103 is equal to or lower than the second threshold value stored in control unit 105. In the example of threshold value shown in FIG. 2, whether the difference between the module temperature of line module 101-2 measured by module temperature sensor 104 and the interior temperature measured by apparatus-interior temperature sensor 103 is equal to or lower than 15 deg. C. is determined. Generally, the module temperature of line module 101-2 measured by module temperature sensor 104 is higher than the interior temperature measured by apparatus-interior temperature sensor 103. Accordingly, this is equivalent to a determination as to whether the module temperature of line module 101-2 measured by module temperature sensor 104 is equal to or lower than the sum of the second threshold value and the interior temperature measured by apparatus-interior temperature sensor 103.

When it is determined that the difference between the module temperature of line module 101-2 measured by module temperature sensor 104 and the interior temperature measured by apparatus-interior temperature sensor 103 is not equal to or lower than the second threshold value stored in control unit 105, in other words, when it is determined that the module temperature of line module 101-2 measured by module temperature sensor 104 is higher than the sum of the second threshold value and the interior temperature measured by apparatus-interior temperature sensor 103, control unit 105 blocks the line connected to line module 101-2 at Step 6. This line blocking operation may be a usual blocking operation, and therefore it is not particularly defined here.

After the line blocking operation is completed, control unit 105 shuts off the supply of power from power supply unit 102 to line module 101-2 at Step 7.

Turning back to Step 5, when it is determined that the difference between the module temperature of line module 101-2 measured by module temperature sensor 104 and the interior temperature measured by apparatus-interior temperature sensor 103 is equal to or lower than the second threshold value stored in control unit 105, in other words, when it is determined that the module temperature of line module 101-2 measured by module temperature sensor 104 is equal to or lower than the sum of the second threshold value and the interior temperature measured by apparatus-interior temperature sensor 103, control unit 105 determines whether the difference between the interior temperature and the exterior temperature is equal to or lower than a predetermined threshold value at Step 8. Specifically, control unit 105 determines whether the difference between the interior temperature measured by apparatus-interior temperature sensor 103 and the exterior temperature measured by apparatus-exterior temperature sensor 106 is equal to or lower than the third threshold value stored in control unit 105. In the example of threshold value shown in FIG. 2, a determination is made as to whether the difference between the interior temperature measured by apparatus-interior temperature sensor 103 and the exterior temperature measured by apparatus-exterior temperature sensor 106 is equal to or lower than 10 deg. C. Generally, the interior temperature measured by apparatus-interior temperature sensor 103 is higher than the exterior temperature measured by apparatus-exterior temperature sensor 106. Accordingly, the above determination is equivalent to a determination as to whether the interior temperature measured by apparatus-interior temperature sensor 103 is equal to or lower than the sum of the third threshold value and the exterior temperature measured by apparatus-exterior temperature sensor 106.

When it is determined that the difference between the interior temperature measured by apparatus-interior temperature sensor 103 and the exterior temperature measured by apparatus-exterior temperature sensor 106 is equal to or lower than the third threshold value stored in control unit 105, in other words, when it is determined that the interior temperature measured by apparatus-interior temperature sensor 103 is equal to or lower than the sum of the third threshold value and the exterior temperature measured by apparatus-exterior temperature sensor 106, control unit 105 blocks the line that is connected to whichever module from among line module 101-1 and line module 101-2, that has a higher module temperature, at Step 9. In detail, control unit 105 selects one module, from among line module 101-1 and line module 101-2, whose temperature, as measured by module temperature sensor 104, is higher, and blocks the line connected to the selected module. This line blocking operation may be a standard blocking operation, and therefore it is not particularly defined here.

After the line blocking operation is completed, control unit 105 shuts off the supply of power from power supply unit 102 to the line module whose the line was blocked at Step 10.

Turning back to Step 8, when it is determined that the difference between the interior temperature measured by apparatus-interior temperature sensor 103 and the exterior temperature measured by apparatus-exterior temperature sensor 106 is not equal to or lower than the third threshold value stored in control unit 105, in other words, when it is determined that the interior temperature measured by apparatus-interior temperature sensor 103 is not equal to or lower than the sum of the third threshold value and the exterior temperature measured by apparatus-exterior temperature sensor 106, control unit 105 blocks the respective lines connected to line module 101-1 and line module 101-2 at Step 11. This line blocking operation may be a usual blocking operation, and therefore it is not particularly defined here.

After the line blocking operation is completed, control unit 105 shuts off the supply of power from power supply unit 102 to common parts (not shown) in line accommodating apparatus 100 at Step 12.

When it is determined at Step 1 that the temperature measured by apparatus-interior temperature sensor 103 is lower than the first threshold value stored in control unit 105, control unit 105 determines whether any line module has been currently shut off from power supply at Step 13. This determination may be carried out by storing information about the line module to which the supply of power has been shut off, when power was shut off, and retrieving the stored information.

When it is determined that the power supply to a line module has been shut down, control unit 105 controls power supply unit 102 to restart the supply of power to the line module to which the supply of power has been shut off at Step 14. In this way, the line module to which the supply of power has been shut off is supplied with power again when the interior temperature becomes equal to or lower than a predetermined temperature.

Here, either of the process at Steps 2 to 4 or the process at Steps 5 to 7 may be carried out first. In other words, the order of determination of the module temperature of line module 101-1 and the determination of the module temperature of line module 101-2 is not defined. Further, both processes may be performed in parallel.

As described above, the power supply for a line module determined to have an unnecessarily high temperature is shut off to thereby suppress heat generation due to operation of the line module, hence making it possible to reduce the interior temperature in line accommodating apparatus 100. This enables internal devices to be protected against any damage and failure due to high temperature. Further, the supply of power is shut off for each line module so that it is not necessary to terminate the operation of line accommodating apparatus 100. Consequently, improvement in service is expected since the operation can be maintained even when the exterior temperature becomes higher than expected, and also a cost benefit can be anticipated since it will not be necessary to use a device that is preset to supporting a special temperature range.

It should be understood that the present invention is not limited to the above-described configuration, and the present invention can be applied to any other apparatus in addition to the communication devices used in a communication system as long as the device has a plurality of operation lines and as long as the power supply to the operation lines can be individually shut down.

Although the present invention has been explained with reference to the embodiment mode as above, the present invention should not be limited to the embodiment mode. Various modifications that can be understood by those skilled in the art may be made to the form and details of the present invention within the scope of the present invention.

This application claims priority based on Japanese Patent Application No. 2009-179341, filed on Jul. 31, 2009, and should incorporate all the disclosure thereof herein.

The invention claimed is:

1. A line accommodating apparatus that accommodates a plurality of lines, the line accommodating apparatus comprising:
a plurality of line modules connected to the plurality of lines, respectively;
a power supply unit that supplies power to each of the plurality of line modules;
an apparatus-interior temperature sensor that measures an interior temperature, which is a temperature inside the line accommodating apparatus;
a module temperature sensor that measures a module temperature, which is a temperature of each of the plurality of line modules;
an apparatus-exterior temperature sensor that measures an exterior temperature, which is a temperature outside the line accommodating apparatus; and
a control unit that shuts off a supply of power from the power supply unit to a line module of the plurality of line modules having a module temperature higher than a sum of a predetermined non-zero second threshold value and the interior temperature when the interior temperature is equal to or higher than a predetermined first threshold value, the predetermined first threshold value and the predetermined non-zero second threshold value being determined by a specific method,
wherein said control unit shuts off a supply of power from the power supply unit to a line module having a highest module temperature when a difference between the interior temperature and the exterior temperature is greater than a predetermined third threshold value which is stored in the control unit.

2. The line accommodating apparatus according to claim 1,
wherein the control unit shuts off the supply of power from the power supply unit to the line module having the highest module temperature when the interior temperature is equal to or higher than the predetermined first threshold value, when no line module having a module temperature that is higher than the sum of the second threshold value and the interior temperature exists, and when the interior temperature is equal to or lower than a sum of the predetermined third threshold value and the exterior temperature.

3. The line accommodating apparatus according to claim 1, wherein the control unit supplies power from the power supply unit to a line module of the plurality of line modules to which the supply of power has been shut off when the interior temperature is lower than the first threshold value.

4. The line accommodating apparatus according to claim 1, wherein the control unit, upon shutting off the supply of power from the power supply unit to the line module, blocks a line having the line module connected thereto and then shuts off the supply of power.

5. The line accommodating apparatus according to claim 1, wherein the plurality of line modules are mutually redundant.

6. The line accommodating apparatus according to claim 2, wherein the control unit, upon shutting off the supply of power from the power supply unit to the line module, blocks a line having the line module connected thereto and then shuts off the supply of power.

7. The line accommodating apparatus according to claim 2, wherein the plurality of line modules are mutually redundant.

8. The line accommodating apparatus according to claim 1, wherein the control unit detects the line module as an unusual line module based on the interior temperature measured by the apparatus-interior temperature sensor and the module temperature measured by the module temperature sensor.

9. The line accommodating apparatus according to claim 1, wherein the control unit is configured to restart the supply of power from the power supply unit to the line module to which the supply power is shut off when the interior temperature becomes lower than the predetermined first threshold value.

10. The line accommodating apparatus according to claim 1, wherein the control unit is configured to shut off the supply of power from the power supply unit to each of the line modules individually.

11. The line accommodating apparatus according to claim 1, wherein the predetermined first threshold value includes a value that corresponds to the interior temperature and is measured in advance when all of the plurality of line modules operate in a normal state.

12. The line accommodating apparatus according to claim 11, wherein the predetermined non-zero second threshold value includes a difference in value between the module temperature that the module temperature sensor measures when the line module of the plurality of line modules is not operating in the normal state and the module temperature that the module temperature sensor measures in advance when the line module of the plurality of line modules is operating in the normal state.

13. A temperature control method of controlling the temperature inside a line accommodating apparatus including a plurality of line modules respectively connected to a plurality of lines, the method comprising:

supplying power to each of the plurality of line modules;

measuring an interior temperature, which is a temperature inside the line accommodating apparatus;

measuring a module temperature, which is a temperature of each of the plurality of line modules;

measuring an exterior temperature, which is a temperature outside the line accommodating apparatus; and shutting off a supply of power to a line module of the plurality of line modules having a module temperature higher than a sum of a predetermined non-zero second threshold value and the interior temperature when the interior temperature is equal to or higher than a predetermined first threshold value, the predetermined first threshold value and the predetermined non-zero second threshold value being determined by a specific method, and shutting off the supply of power to a line module of the plurality of line modules having a highest module temperature when a difference between the interior temperature and the exterior temperature is greater than a predetermined third threshold value which is stored in a control unit.

14. The temperature control method according to claim 13, further comprising:

shutting off a supply of power to the line module having the highest module temperature when the interior temperature is equal to or higher than the predetermined first threshold value, when no line module having a module temperature that is higher than the sum of the second threshold value and the interior temperature exists, and when the interior temperature is equal to or lower than a sum of the predetermined third threshold value and the exterior temperature, the predetermined third threshold value being determined by the specific method.

15. The temperature control method according to claim 13, further comprising:

supplying power to a line module of the plurality of line modules to which the supply of power has been shut off, when the interior temperature is lower than the first threshold value.

16. The temperature control method according to claim 13, further comprising:

upon shutting off the supply of power to the line module, shutting off the supply of power to the line module after a line connected to the line module has been blocked.

17. The temperature control method according to claim 14, further comprising:

upon shutting off the supply of power to the line module, shutting off the supply of power to the line module after a line connected to the line module has been blocked.

18. The temperature control method according to claim 13, wherein the shutting off of the supply of power comprises detecting the line module as an unusual line module based on the measured interior temperature and the measured module temperature.

19. The temperature control method according to claim 13, further comprising:

restarting the supply of power from the power supply unit to the line module to which the supply power is shut off when the interior temperature becomes lower than the predetermined first threshold value.

20. The temperature control method according to claim 13, wherein the shutting off supply of power comprises shutting off the supply of power from the power supply unit to each of the line modules individually.

* * * * *